US010518823B1

(12) United States Patent
Childress et al.

(10) Patent No.: US 10,518,823 B1
(45) Date of Patent: Dec. 31, 2019

(54) TWO PIECE SHIPPING CONTAINER AS COVERED FLATBED TRAILER

(71) Applicant: Cakeboxx Technologies, LLC, McLean, VA (US)

(72) Inventors: Louis Deak Childress, Lynchburg, VA (US); Daine Eisold, McLean, VA (US)

(73) Assignee: Cakeboxx Technologies, LLC, McLean, VA (US)

( * ) Notice: Subject to any disclaimer, the term of this patent is extended or adjusted under 35 U.S.C. 154(b) by 0 days.

(21) Appl. No.: 15/393,729

(22) Filed: Dec. 29, 2016

Related U.S. Application Data

(60) Provisional application No. 62/275,476, filed on Jan. 6, 2016.

(51) Int. Cl.
*B62D 33/08* (2006.01)
*B62D 33/02* (2006.01)
*B60J 7/10* (2006.01)
*B62D 65/02* (2006.01)

(52) U.S. Cl.
CPC .............. *B62D 33/08* (2013.01); *B60J 7/106* (2013.01); *B62D 33/02* (2013.01); *B62D 65/02* (2013.01)

(58) Field of Classification Search
CPC ........ B62D 33/08; B62D 33/02; B62D 65/02; B60J 7/106
USPC ............ 296/100.01, 100.02, 100.04, 100.07, 296/100.17, 100.18, 35.3; 105/263, 105/377.01, 377.08, 377.1, 377.11, 378, 105/379, 370; 410/54, 55, 68–70, 76, 410/82–84, 120; 160/90–91
See application file for complete search history.

(56) References Cited

U.S. PATENT DOCUMENTS

| 2,556,418 | A | | 6/1951 | Del Mar |
| 2,920,781 | A | | 1/1960 | Butcher |
| 3,042,227 | A | | 7/1962 | Tantlinger |
| 3,088,619 | A | | 5/1963 | Boucher |
| 3,261,493 | A | | 7/1966 | Smith |
| 3,374,915 | A | | 3/1968 | Verhein |
| 3,408,958 | A | * | 11/1968 | Van De Plasch .... B61D 39/008 105/377.08 |
| 3,529,741 | A | | 9/1970 | Walker |
| 3,568,912 | A | | 3/1971 | de simas |

(Continued)

FOREIGN PATENT DOCUMENTS

| DE | 20201657 U1 | 6/2002 |
| FR | 2956859 A1 | 9/2011 |
| GB | 2089768 A | 6/1982 |

*Primary Examiner* — Stephen T Gordon
(74) *Attorney, Agent, or Firm* — James Creighton Wray

(57) ABSTRACT

A flatbed deck with corner castings connects to the intermodal equipment trailer chassis. Twist locks are retractable in upper corner castings to provide an absolutely flat deck to facilitate loading and unloading. Lower corner castings are connected to corner twist locks of a trailer chassis. Cargo is loaded and a rigid three-dimensional lid is lowered onto the flatbed deck. The rigid lid has corner castings that cooperate with twist locks at corners of the new flatbed deck. Lid corner castings are recessed in the lid. The lid seals to the deck to prevent moisture ingress. Corner castings extend slightly downward from the corners of the lid. Two or more short individual lids are secured separately to the new decks. Partial loads are individually covered and protected by the short lids which are seated and sealed to the deck by securing lid corner castings.

19 Claims, 7 Drawing Sheets

(56) References Cited

U.S. PATENT DOCUMENTS

| | | | |
|---|---|---|---|
| 3,584,757 A | 6/1971 | Blaisdell | |
| 3,602,376 A | 8/1971 | DePiano | |
| 3,760,970 A | 9/1973 | Lutz | |
| 3,797,691 A | 3/1974 | Williams, Jr. | |
| 3,853,238 A | 12/1974 | Luisada | |
| 3,872,555 A | 3/1975 | Link | |
| 3,908,852 A | 9/1975 | Ricobene | |
| 4,010,990 A | 3/1977 | Rowley | |
| 4,015,715 A | 4/1977 | Kelf | |
| 4,120,415 A | 10/1978 | Hopkins | |
| 4,209,887 A | 7/1980 | Saunders | |
| 4,355,732 A | 10/1982 | Nessfield | |
| 4,360,115 A * | 11/1982 | Saunders | B65D 88/005 220/1.5 |
| 4,416,385 A | 11/1983 | Clare | |
| 4,546,896 A | 10/1985 | Reid | |
| 4,809,851 A | 3/1989 | Oestreich, Jr. | |
| 4,936,451 A | 6/1990 | Shuert | |
| 5,890,757 A * | 4/1999 | Masterson | B60J 7/1614 296/100.02 |
| 6,065,917 A * | 5/2000 | Shambeau | B60P 7/0807 410/106 |
| 6,390,742 B1 * | 5/2002 | Breeden | B60P 7/132 410/80 |
| 6,499,783 B1 * | 12/2002 | Husted | B60P 3/04 296/35.3 |
| 6,918,721 B2 * | 7/2005 | Venton-Walters | B60P 7/0807 410/102 |
| 8,002,134 B2 | 8/2011 | Whyte | |
| 2007/0246466 A1 | 10/2007 | Whyte | |
| 2015/0231952 A1 * | 8/2015 | Libner | B60J 7/065 296/100.18 |

* cited by examiner

TWO PIECE SHIPPING CONTAINER AS COVERED FLATBED TRAILER

This application claims the benefit of U.S. Provisional Application No. 62/275,476 filed Jan. 6, 2016, which is hereby incorporated by reference in its entirety as if fully set forth herein.

This invention includes by reference the disclosure of Provisional Patent Application 62/259,104 as if fully set forth herein.

BACKGROUND OF THE INVENTION

Cargo shippers have limited choices in the type of conveyance form factor they can use for what is typically known as flatbed cargo (side-loaded or top-loaded). They can use a fully enclosed truck or trailer, a fully enclosed shipping container, a flat rack-type shipping container or a flatbed trailer. Each of these options presents significant limitations to the shipper and cargo handlers.

The loading and unloading and inspection processes associated with current-day trucks, trailers and shipping containers is time consuming and frequently contributes to damage of the goods being shipped. The open back end/door end design of these transport options requires the use of forklifts or other mechanical devices and a lot of manpower to move cargo into and out of the enclosures. This process can be very lengthy and can cause substantial damage to the goods, to the trailer or container itself. There is also a physical threat to the safety of the logistics workers trying to work inside of the trailers/containers to assist the forklift drivers with accurate load positioning inside the container and lashing or securing the cargo. Further, effective securing of cargo loads in trailers or containers is difficult because once fully loaded there is very little room inside them to permit the use of tie downs, lashing gear, bracing or similar restraining devices.

Further impediments to loading and unloading cargo in covered cargo trucks, trailers and containers stem from height restriction of the doors and ceilings of the trailer or container itself. These cargo conveyances must be loaded using machines that are limited in vertical reach/height by the height of the trailer or container doorways and cargo areas through which those machines must move. Actual cargo heights is further limited by the need to raise fork lift blades to move and position the cargo, leaving empty cargo space at the tops of loads.

Flatbed trailers, flat rack containers and flatbed trucks avoid the problems of loading from one end, vertical clearances and the lack of access to properly secure the cargo, but they present the unwelcome but necessary prospect of fully exposing the cargo to the elements, accidents, thieves and vandals. Typically, only a thin piece of canvas or vinyl tarpaulin separates the cargo from these adverse conditions. As currently designed, all flatbed trailers, flat rack containers and flatbed trucks leave loads exposed to the environment and accessible for damage, pilferage and theft.

A need exists for a safer, more secure, more efficient and more flexible solution to move cargo that now needs to move on a flatbed trailer, flat rack container or truck.

SUMMARY OF THE INVENTION

The invention provides a new method of transporting cargo by combining the practical elements of a flatbed trailer with the protective elements of an enclosed trailer or shipping container. It does this by adapting the bottom/deck component of a two piece shipping container for use in a permanent or temporary application as a flatbed trailer when mounted to a standard container chassis. When attached to the container chassis with the normal twist lock devices on the chassis, a two piece intermodal shipping container base becomes a flatbed trailer deck. By adding the container lid of the two piece container, the flatbed trailer becomes a covered, fully enclosed cargo conveyance that protects the loaded cargo from the elements, theft, vandalism, and general damage caused by uncovered transport—exactly in the same way as a typical fully enclosed shipping container or truck trailer would do.

This invention solves problems of the prior art by providing a new, fully accessible open flatbed deck that is adapted to make use of the standard container chassis. When combined with a lid, the invention creates a great new 'flatbed, with a lid' concept, offering the efficiencies of open loading of a flatbed combined with the complete covered protective security of a shipping container. With this invention, after fitting it to a standard container chassis, it can be loaded by machines without any height restrictions. The cargo may be loaded over the sides and ends of the flatbed platform. The cargo may be loaded to the full permissible internal or external height without leaving space for lifting and lowering loads when loading or unloading cargo. Tie downs and other means of securing the cargo are easily accomplished as the cargo is loaded prior to lowering and fitting of the lid on the flatbed deck.

The new invention enables unused or low utilization container chassis to serve a secondary function as a flatbed trailer and develop a greater return on investment for the chassis trailer. The invention allows a container chassis to be dual-purposed as both an open-top flatbed trailer, and as a fully covered shipping container, in operating scenarios that save time, minimize handling costs and eliminate cargo damage or loss. The invention provides optimization of chassis assets and provides more flexibility and cargo optimization for the owners and operators of this equipment—while still allowing the chassis to be used for the purpose of transporting intermodal shipping containers.

The new container base flatbed deck has corner castings with twist lock-receiving openings at lower corners that attached to twist locks on trailer chassis. The flatbed deck is secured to the truck trailer chassis at the front and rear corners by twist lock devices according to requirements of the U.S. Department of Transportation Federal Motor Carrier Safety Administration for connecting intermodal containers to truck trailer chassis and relevant ISO standards. Corner castings on the upper corner of the deck have twist locks for attaching to lower corner castings on the two piece container lids. When the rigid three-dimensional (five sided/open bottom) lids are placed over the cargo and locked in place, the cargo is secure from damage, theft and pilfering. Physical locks and seals can be used on each of the four corner twist lock operating handles to ensure the two deck and lid components cannot be physically separated by unauthorized personnel. Waterproof seals are fitted between the flatbed deck and lid to prevent environmental damage. The lids fitted to the flatbed deck can be configured with or without cargo loading and human access doors as necessary to manage the cargo loads.

When fully assembled as a certified unit, the two piece deck and lid shipping container can be used for cargo shipment in a true multi-modal, highway, rail and sea scenario. This invention can be built and used in multiple lengths, widths and heights. If built to be compliant with standard shipping container lengths, including 20', 40' 45'

48' and 53' and in normal trailer or container widths, principally 8'0" and 8'6", and heights normally of 9'6" or less, they can be used seamlessly for intermodal transport. Use of the new flatbed deck in these standard container sizes allows for cargo to be easily loaded for intermodal shipment onto the deck component for transportation by truck, then when the lid is installed, the new flatbed deck can be disconnected from the trailer chassis, forming an intermodal container that can now be shipped as ocean freight, without ever having to remove, repack or cross-deck the cargo in a transshipment or consolidation facility.

In all lengths and widths, the converted flatbed deck can be subdivided to hold multiple lids of the same or different lid sizes. For examples, a 40' deck can house two 20' lids, and a 20' flatbed can hold two 10' lids, and so forth. Modular lid units are fitted with the same type of twist lock physical attachment points as the deck to allow complete compatibility with the other components of the lid and the chassis and easily all them to be locked down on the deck component that is secured to a truck or trailer chassis utilizing the same types of twist locking devices. This allows the use of a standard intermodal container chassis in the 'as is' configuration without any modifications for specific use in this invention. Retractable, normal or zero-clearance twist locks can be used to secure the lid or lids to the single flatbed decks.

With the lids removed or not utilized, the flatbed deck creates a totally flat cargo loading surface. The deck of the two piece container is outfitted with a variety of user-defined flush mounted or raised perimeter and centerline cargo tie down points or otherwise located cargo tie down points to assure cargo security in transit.

In the multi-lid application, provisions for physically locking the lid or lids to the deck prevent unwanted removal of the lids from the deck and exposing the cargo to the environment, theft or damage is similar as described above for physically locking and preventing the movement of the twist lock devices. For stability of the lids in the multiple-lid configuration, side operated Boxx-to-Boxx interbox connector type twistlock devices are used at the top corners of the lids to solidly lock the individual lids together into one united structure for transport.

When completely assembled the complete unit is able to be transported and utilized as multiple, covered flat bed units. The flatbed deck allows normally uncovered flatbed cargo to be shipped under the fully enclosed lid, protecting the cargo from weather, pilferage, damage and theft. As the invention allows the use of modular lid units of various lengths on a single deck, the invention easily facilitates the use of a flatbed trailer for covered, protected, less than truck load (LTL) or less than container load cargo shipment, by allowing segregation of the cargo into numerous smaller sized but still covered loads. The invention provides shippers and third party logistic providers the ability to sort, consolidate and prioritize materials or goods destined for a particular distribution point in a smaller container space so that unloading would be enhanced and the unloaders would not have to unload other goods from inside a longer container.

By the installation of fork lift tubes in each lid, the invention permits the use of smaller forklifts and lifting devices to remove the smaller lids, and to significantly expedite the loading and unloading process for the cargo.

These and further and other objects and features of the invention are apparent in the disclosure, which includes the above and ongoing written specification, with the claims and the drawings.

BRIEF DESCRIPTION OF THE DRAWINGS

FIG. 4 shows a 40' single piece lid unit with forklift tubes in the top for handling the lid and fork tubes in the deck for moving the deck onto and off the chassis.

FIG. 8 shows a depiction of a 40' modular three lid fully assembled unit.

DETAILED DESCRIPTION

Figure 1:
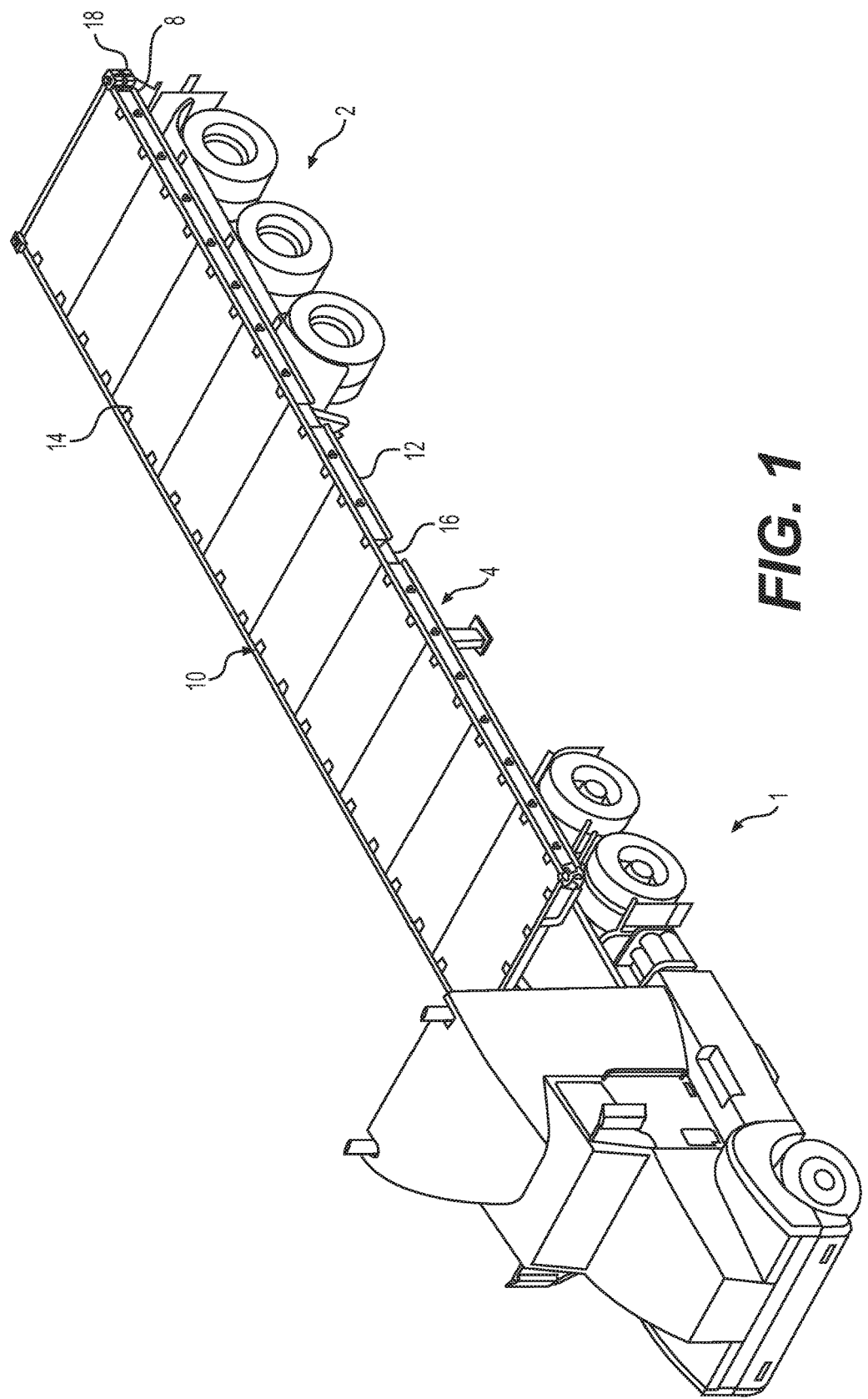
FIG. 1 is a perspective view of a flatbed trailer truck with a flatbed deck constructed according to the invention.

FIG. 1 is a perspective view of a flatbed deck installed on a container chassis-style trailer with attached tractor truck 1 with a flatbed deck 10 constructed according to the invention and connected to the trailer 2. The trailer has a chassis 4 with twist locks 8 at corners on which a new flatbed deck 10 is mounted. The new flatbed deck 10 has a frame 12 on which deck plates 14 are secured for carrying cargo. The new flatbed deck 10 has lift fork access tubes 16 so that the deck may be lowered into or lifted from the chassis 4 with or without cargo on the flatbed deck 10. The chassis has twist locks 8 at its corners to engage corner castings 18 on lower corners of deck 10 to lock the deck to the trailer chassis 4 or to unlock the deck from the chassis.

The connections between the trailer chassis 4 and the new flatbed deck 10 may be similar to the connections between the bases of intermodal cargo containers and trailer chassis. For example, trailer chassis 4 are often constructed with two parallel longitudinal steel I-beams extending front to rear with interior cross-members welded as trusses and traversely extending front and rear supports which are locked by twist locks 8 to the bases of the intermodal cargo containers. The new flatbed deck has twist lock-receiving corner castings 18 at corners of the deck 10 that cooperate with twist locks 8 to lock the new flatbed deck to the trailer chassis 4. Twist locks 19 at upper corners of the deck 10 are used to lock a rigid three-dimensional cover on the deck.

Figure 2:
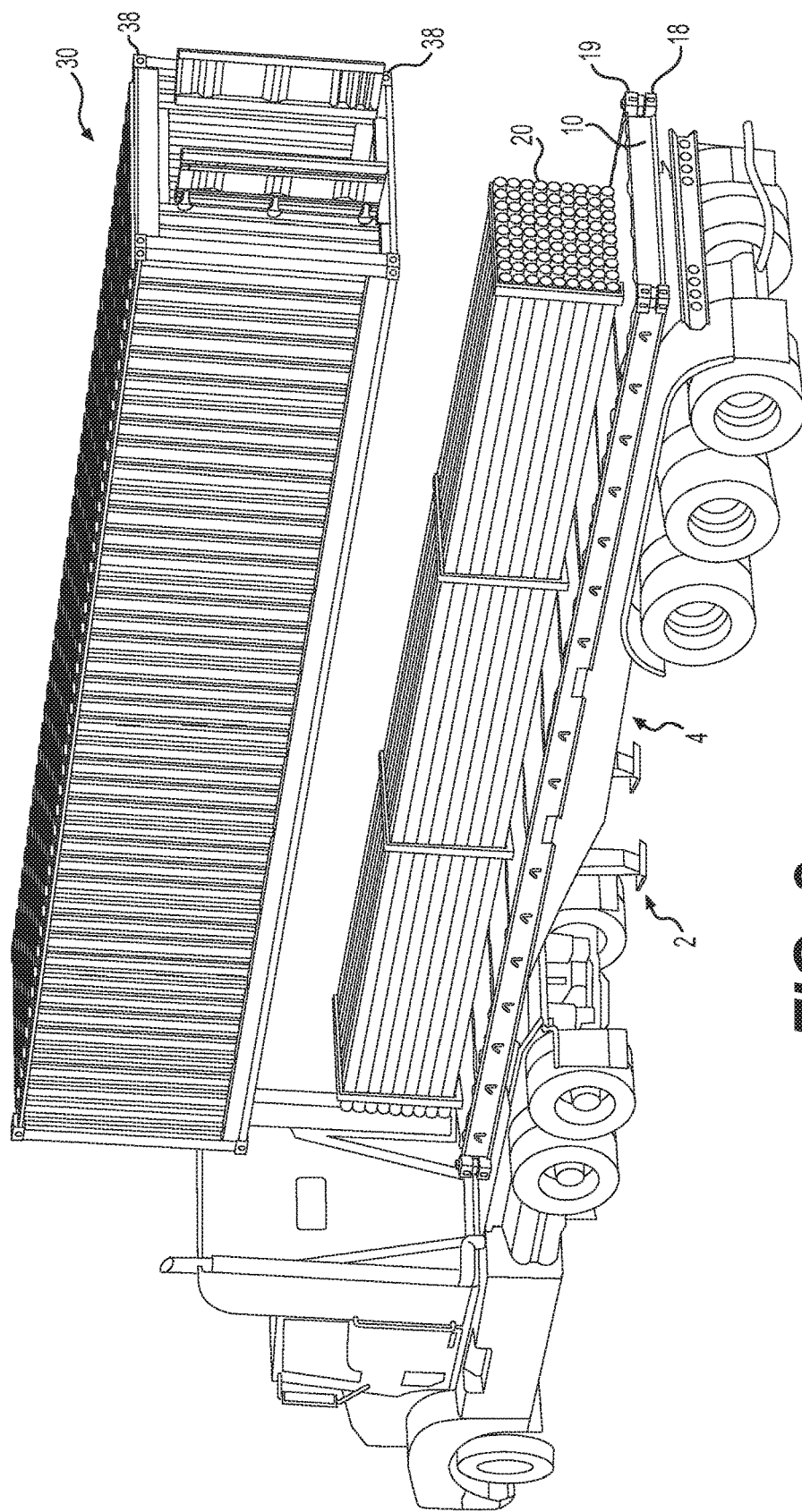
FIG. 2 is a perspective view of the flatbed trailer truck of FIG. 1 which has been loaded and a schematic representation of a lid being placed on or removed from the flatbed trailer.

FIG. 2 is a perspective view of the flatbed trailer 2 of FIG. 1 which has been loaded. A schematic representation shows a lid 30 being placed on flatbed trailer 2. Cargo 20, which would be difficult to load from an end of a covered trailer, is shown loaded on the new flatbed deck 10. Lid 30 is being lowered to the deck 10 to protect the cargo. The lid has twist lock-receiving corner castings 38 at its upper and lower corners. The twist lock-receiving corner castings 38 at the lower corners of the lid 30 are used to lock the lid to the twist locks 19 at the corners of the flatbed deck 10. Levers provided in the flatbed twist locks 19 after being twisted into locked position are further lockable to prevent unauthorized removal of the lid 30.

Figure 3:
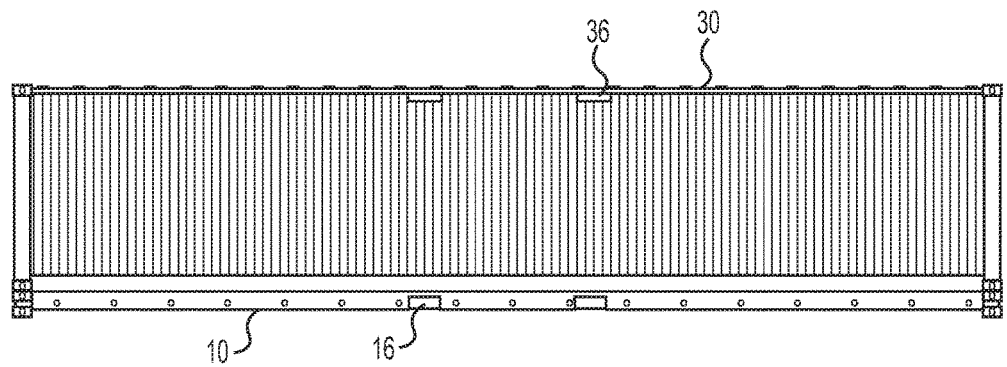
FIG. 3 is a side elevation of the flatbed deck and a joined lid as shown in FIGS. 1 and 2.

FIG. 3 is a side elevation of the flatbed deck 10 and a joined lid 30 as shown in FIGS. 1 and 2. The lid 30 has fork tubes 36 near its top for lifting and lowering the lid 30 with standard fork lifts. The lift fork tubes 16 in the new deck 10 are used to raise and lower the deck from and onto a truck chassis or to lift or lower the entire deck 10 and lid 30 assembly with any cargo inside.

Figure 4:
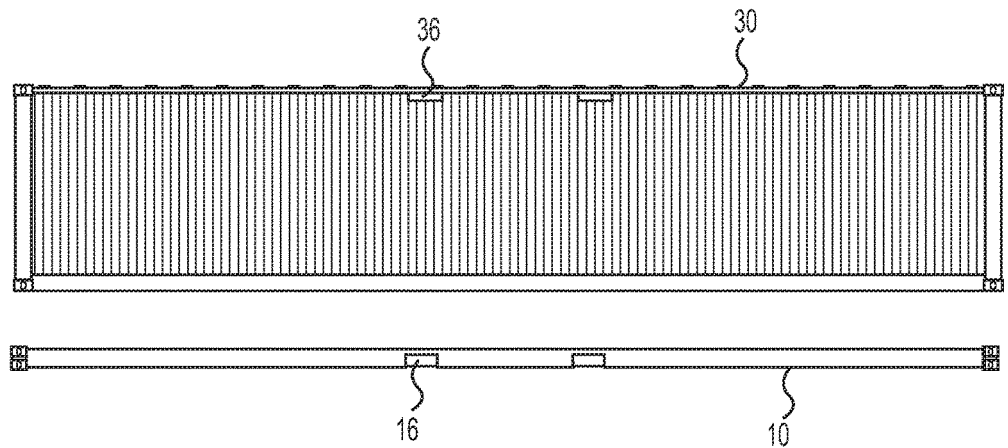
FIG. 4 is a side elevation of the lid lifted from the flatbed as shown in FIGS. 1-3.

FIG. 4 is a side elevation of the lid lifted 30 from the flatbed deck 10. The 40' lid 30 has forklift tubes 36 in the top for handling the lid and forklift tubes 16 in the deck 10 for moving the deck onto and off the truck trailer chassis. The lid 30 is shown raised from the flatbed deck 10.

In addition to the use of a two piece container base as a covered trailer flatbed deck 10, this invention can be used in multiple standard shipping container lengths including 20', 40' 45' 48' and 53' as well as multiple container widths, principally 8'0" and 8'6" widths standard to normal over-the-road truck/trailer transportation. In all lengths and widths, the new flatbed deck can be subdivided to hold multiple different lid sizes. A 40' deck can house two 20' lids; a 20' new flatbed deck can hold two 10' lids, and so forth.

The modular lid units 30 are locked down on the chassis deck 10 utilizing the same types of twist locking devices currently being used to lock down standard shipping containers to truck trailer chassis. This allows the use of a standard intermodal container carrier trailer chassis in the present configuration without any modifications. Retractable twist locks, fixed and zero-clearance twist locks on the deck are used to secure the lid or lids of the two piece container to the new flatbed deck to create a totally flat bed when the deck is used without the lid. Lower corner castings of the new flatbed decks are secured by twist locks on the trailer chassis.

The deck of the two piece container is outfitted with a variety of flush mounted or raised perimeter and centerline or otherwise located cargo tie down points to assure cargo security in transit.

Figure 5:
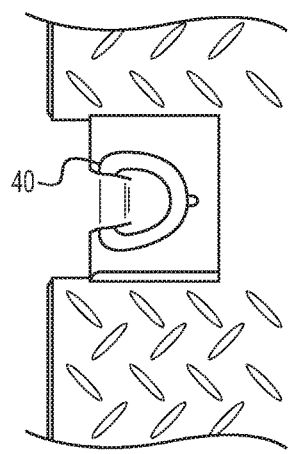
FIG. 5 is a detail of a one of several tie down points located around the periphery of the deck.

FIG. 5 is a detail of a one of several tie down points located around the periphery of the deck. D-ring tie downs 40 are flush mounted or raised on the perimeter and center line or otherwise located at tie down points to assure cargo security in transit. Side and front end tie downs normally are not accessible after loading cargo in conventional covered trailers.

Figure 6:
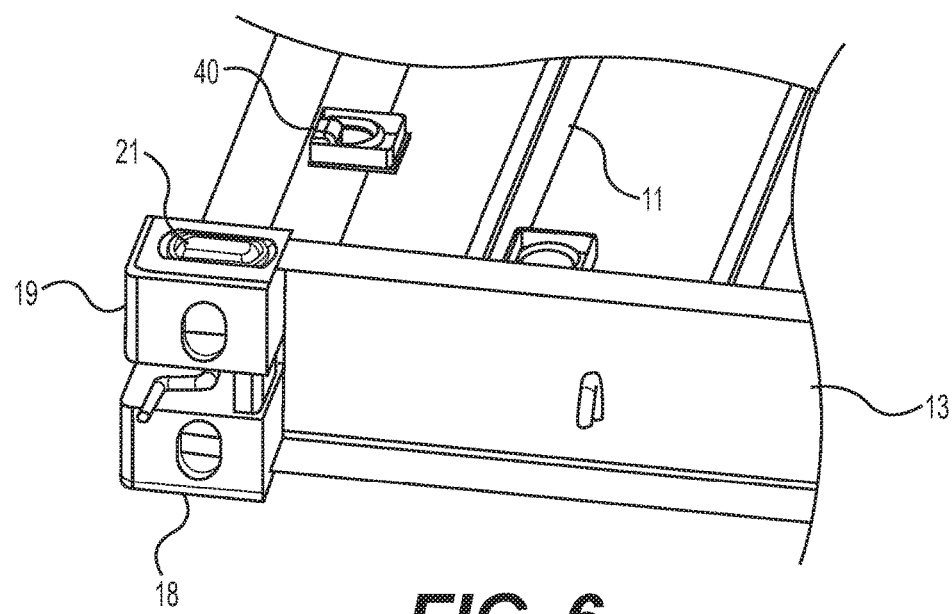
FIGS. 6 and 7 are corner details of flatbed deck frames showing lid-to-flatbed deck locks and end-to-end lock receivers or corners. Boxx-to-Boxx twistlock devices are used at the top corners of the lids and at the bottoms of the lids as desired to firmly connect the individual lids together into one united structure for transport.
Figure 7:
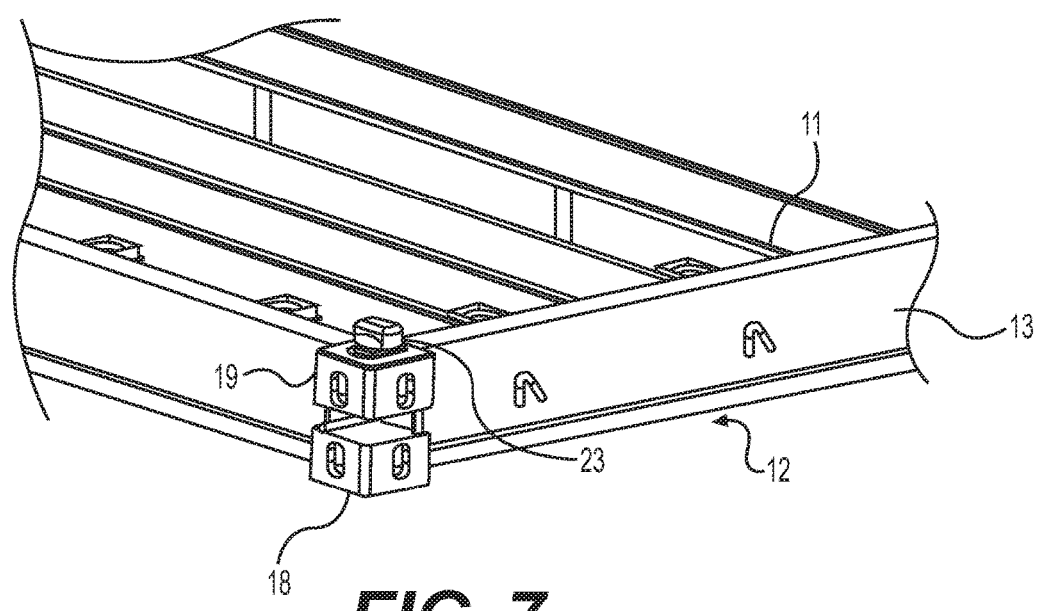

FIGS. 6 and 7 are corner details of flatbed deck frames 12. Cross-members 11 extend between I-beams 13 at sides and ends of the deck frame 12. Frame-mounted D-ring tie downs 40 are accessed through recesses or openings in the deck plates. Tie downs 40 are welded to the frame members before the deck plates 14 shown in FIG. 1 are secured to the frame. Corner castings 18 at lower corners of the deck frame 12 are secured by twist locks 8 on a truck trailer chassis. Twist locks 19 at upper corners of the deck frame retract 21 and extend 23 as shown in FIGS. 6 and 7 for providing a flat deck and then connecting to lid corner castings.

Figure 8:
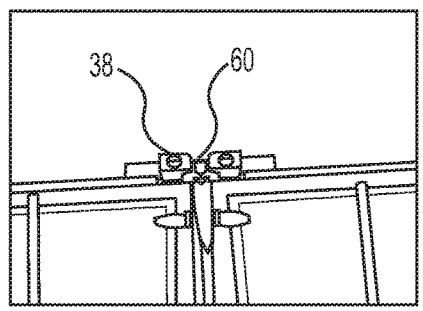
FIGS. 8-10 show side-to-side locks between lid corners and bases for use when more than one lid is secured on a new flatbed deck. When completely assembled, the complete unit is able to be transported and utilized as multiple, covered flatbed units.
Figure 9:
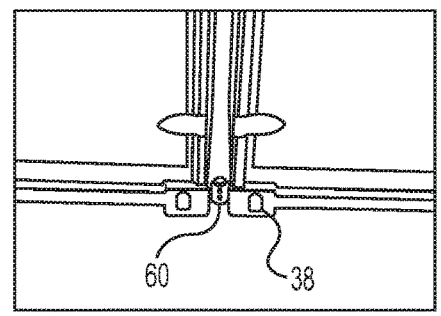
Figure 10:
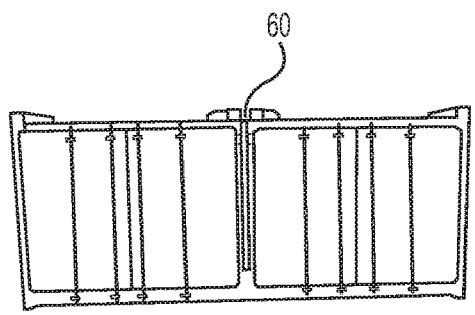

FIGS. 8-10 shows side-to-side locks 60 between lid corner castings 38 for use when more than one lid is secured on a new flatbed deck. When completely assembled, the complete unit is able to be transported and utilized as multiple, covered flatbed units. FIG. 8 shows a depiction of a 40' modular three lid fully assembled unit. Twist locks 60 having oppositely projecting lugs are inserted in lateral lock-receiving openings in corner castings 38 at upper and lower corners of lids 30 to secure the lids end to end. End-to-end lock-receiving corner castings are shown. Boxx-to-Boxx twistlock devices 60 are used at the top corners of the lids and at the bottoms of the lids as desired to firmly connect the individual lids together into one united structure for transport. The twist lock-receiving corner castings 38 have oval openings through which oval lugs are extended into adjacent oval openings of abutted locks. The lugs are then twisted 90° to secure the abutted locks together.

Figure 11:
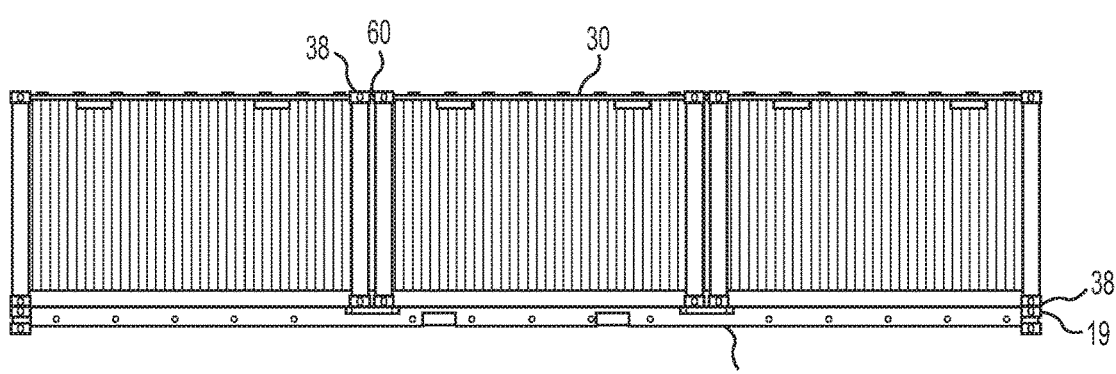
FIG. 11 is a side elevation of three new end-to-end locked lids locked to a new flatbed deck.

FIG. 11 is a side elevation of three new end-to-end locked short lids 30 locked to a new flatbed deck. Twist locks 60 are used between adjacent short lids to maintain the stability during transportation. Bottom corner castings 38 on short lids fit in recesses in sides of the new flatbed deck 10 and are secured by twist locks 19 secured along sides of the deck 10. The single unit with deck 10 and three lids may be lifted and transferred to another position by a fork lift.

Figure 12:
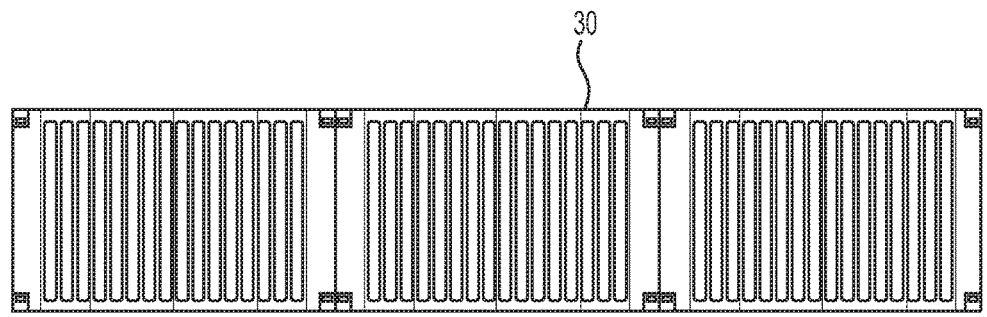
FIG. 12 is a top view of three new end-to-end lids.
Figure 13:
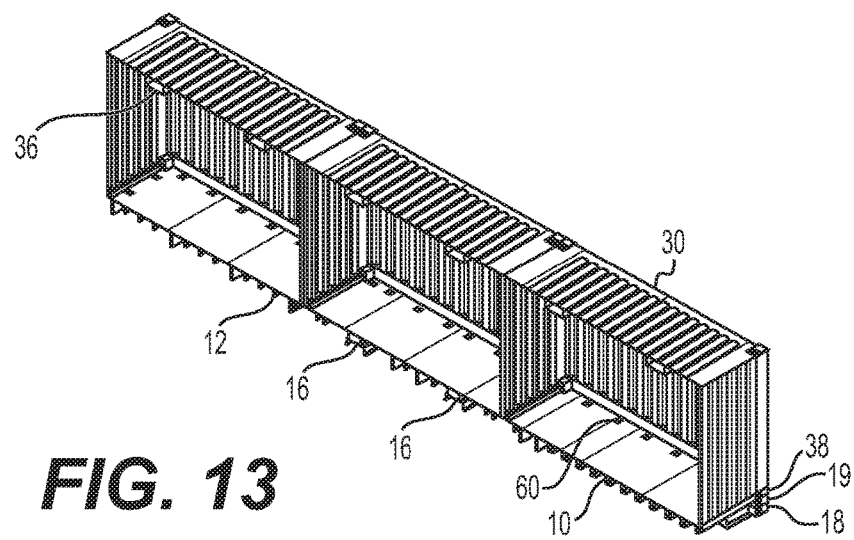
FIG. 13 is a perspective cross-sectional view of three new end-to-end lids locked on a new flatbed deck.

FIG. 12 is a top view of three new locked end-to-end lids 30. FIG. 13 is a cross-sectional perspective view of three new end-to-end lids 30 locked on a new flatbed deck. Three individual lids 30 are connected to the flatbed deck 10. Fork insertion tubes 36 for lifting and lowering the lids are shown under the tops of the lids. Fork insertion tubes 16 are shown in the frame 12 of the flatbed deck 10 for lifting the deck and placing it on or removing it from a chassis of a trailer. Deck corner castings 18, twist locks 19 and lid corner castings 38 on adjacent corners of the flatbed deck 10, lids 30 and tie downs 40 are shown in the cross-sectional view.

Figure 14:
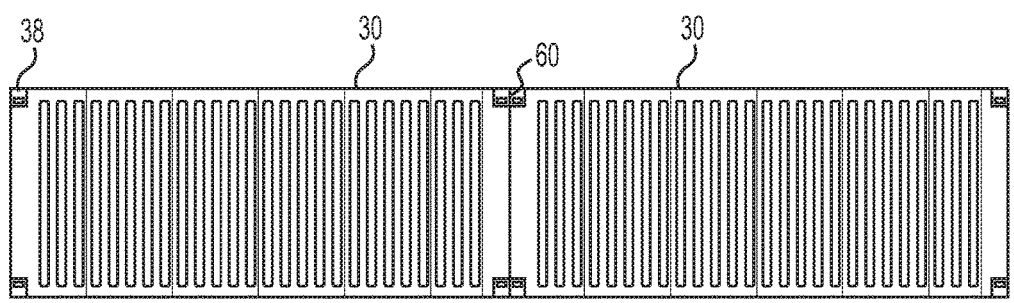
FIG. 14 is a top view of the two new lids locked end to end.

FIG. 14 is a top view of the two new lids 30 locked end to end. Two lids 30 are joined by twist locks 60 between adjacent corner castings 38.

Figure 15:
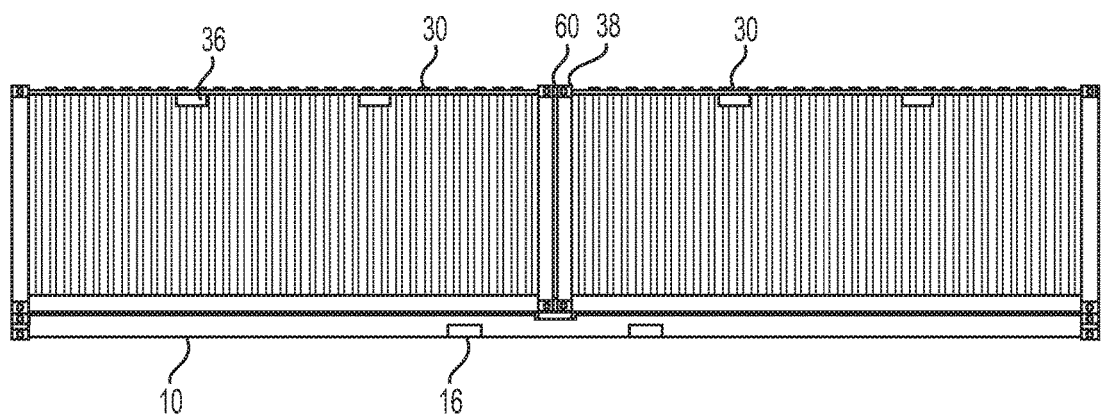
FIG. 15 is an elevation of the two new locked end-to-end lids locked on a new flatbed deck.

FIG. 15 is an elevation of the two new end-to-end lids 30 locked on a new flatbed deck. Two lids 30 joined by twist locks 60 are secured on the lids 30 which are secured on the flatbed deck 10 by cooperating twist locks 19 engaging lower corner castings 38. Fork-receiving tubes or tunnels 16 in the new flatbed deck 10 and fork-receiving tubes 36 in the tops of the lids 30 are shown.

Figure 16:
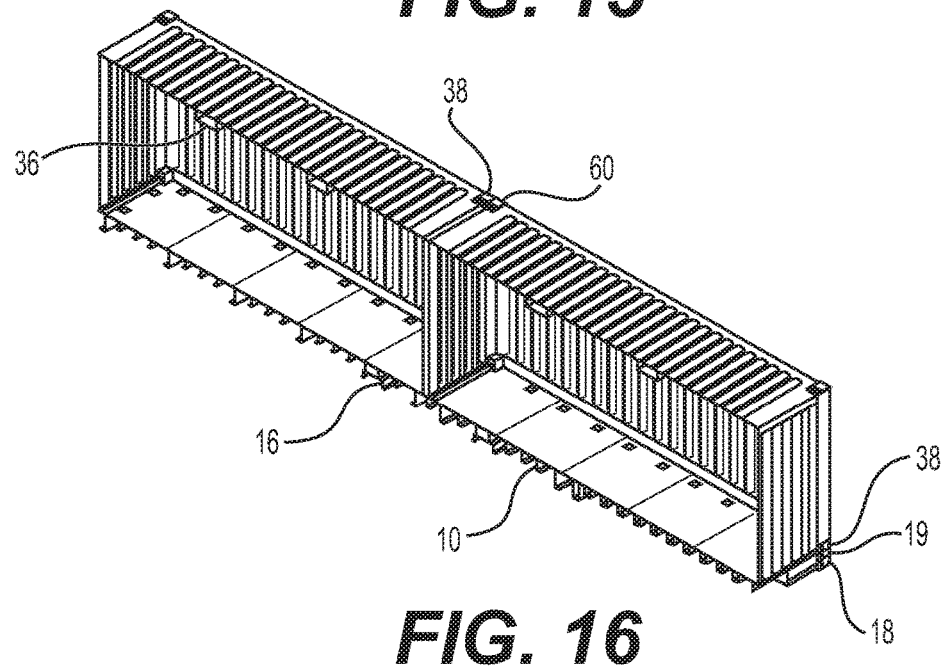
FIG. 16 is a perspective cross-sectional detail of two new end-to-end locked lids locked on a new flatbed deck.

FIG. 16 is a perspective cross-sectional detail of two new end-to-end locked lids 30 locked on a new flatbed deck 10. The deck frame 12 has fork-receiving tubes 16. The lids 30 have fork-receiving tubes 36. Adjacent corner castings 38 on the lid are locked to each other. Lower corner castings 38 are held by twist locks 19 on the deck 10. The deck 10 is locked to a trailer chassis by chassis twist locks inserted in deck lower corner castings 18.

When attached via the twist lock devices 8 on the truck chassis 4, the deck 10 of the two piece shipping container becomes a flatbed trailer deck. By adding the container lid 30, the flatbed trailer becomes a covered cargo conveyance that protects the loaded cargo from the elements, theft, vandalism, and general damage caused by uncovered transport.

Intermodal equipment trailers having roadability often have chassis with strong longitudinal beams visible under a container and strong front and rear cross beams. The strong front and rear cross beams have twist locks at the four corners of the trailer. The four twist locks connect to corner castings at the four lower corners of an intermodal container that is carried on the trailer chassis.

The new invention connects a flatbed deck to the intermodal equipment trailer chassis. The flatbed deck has four corner castings below four twist locks. In one form, the twist locks are retractable to provide an absolutely flat deck to facilitate loading and unloading. The lower corner castings are connected to the corner twist locks of a trailer chassis. After cargo is loaded onto the new flatbed deck, a rigid three-dimensional lid is lowered onto the flatbed deck.

The rigid lid has corner castings at its four corners that cooperate with the twist locks at the four corners of the new flatbed deck. The lid corner castings are recessed into lower corners of the lid so that the entire longitudinal and end edges of the lid seat and seal to the deck to prevent ingress of water or moisture.

In one form of the invention, the twist locks are recessed at corners of the new deck, and the corner castings extend slightly downward from the corners of the lid.

In one form of the invention, retractable or recessed twist locks may be positioned along opposite longitudinal edges of the new decks. Two or more short individual lids may be secured separately to the new decks so that partial loads may be individually covered and protected from the elements by the short lids which are seated and sealed to the deck by securing the lids' corner castings with the deck's twist locks.

In one form of the invention, the twist locks may be mounted on the lids to cooperate with complementary corner castings on the new decks.

Alternatively, corner castings provided in the lids and the decks may be connected with separable twist lock assemblies.

While the invention has been described with reference to specific embodiments, modifications and variations of the invention may be constructed without departing from the scope of the invention, which is defined in the following claims.

We claim:

1. Apparatus comprising:
    a trailer for a semi-trailer truck,
    the trailer further comprising
    a chassis having longitudinal and transverse chassis members,
    a towing vehicle connection at a front of the chassis for connecting to a towing vehicle,
    axles connected to the chassis rearward of the towing vehicle connection,
    wheels connected to the axles,
    a flatbed deck connected to the chassis,
    the flatbed deck having sides and ends,
    flatbed deck corner connectors mounted at corners of the flatbed deck,
    a three-dimensional rigid lid having a top, sides and ends and an open bottom,
    the open bottom of the lid and the flatbed deck having similar peripheral dimensions,
    lid corner connectors mounted wherein the lid sides and the lid ends intersect at corners of the lid open bottom, and
    interconnectors interconnecting the lid corner connectors and the flatbed deck corner connectors when the lid corner connectors are juxtaposed with the flatbed deck corner connectors,
    whereby juxtaposing the lid corner connectors and the flatbed deck corner connectors and engaging the interconnectors seals the lid on the flatbed deck, secures the lid on the flatbed deck and protects cargo on the flatbed deck from weather elements and from theft,
    whereby disengaging of the interconnectors from the lid corner connectors permits lifting of the lid away from the flatbed deck and permits loading and securing cargo on the flatbed deck from the sides and ends of the flatbed deck before the lid is lowered on the flatbed deck, and
    wherein the chassis has corner castings at front and rear corners of the chassis and the flatbed deck has lower corner castings at lower corners of the flatbed deck, and further comprising frame twist locks connecting the chassis corner castings and the flatbed deck lower corner castings.

2. The apparatus of claim 1, wherein the flatbed deck corner connectors and the lid corner connectors comprise complementary flatbed deck upper corner castings and lid corner castings and the interconnectors comprise lid twist locks.

3. The apparatus of claim 2, wherein the lid twist locks are assembled in the flatbed deck upper corner castings.

4. The apparatus of claim 2, wherein the lid twist locks have handles to rotate and engage and disengage the lid twist locks with the lid corner castings, and wherein the handles of the lid twist locks are lockable against sides of the flatbed deck.

5. The apparatus of claim 4, wherein the lid twist locks are retractable in the flatbed deck upper corner castings.

6. The apparatus of claim 1, further comprising multiple cargo tie downs mounted on the flatbed deck near sides of the flatbed deck.

7. The apparatus of claim 6, wherein the cargo tie downs are D-ring tie downs that are flush mounted along the perimeter of the flatbed deck to tie down cargo.

8. The apparatus of claim 1, wherein the lid has lifting fork tubes near a center of the top of the lid.

9. The apparatus of claim 1, wherein the flatbed deck has lifting fork tubes near a center of the flatbed deck for lifting the flatbed deck from the trailer chassis when the frame twist locks are disengaged from the flatbed deck lower corner castings.

10. Apparatus comprising:
    a flatbed deck adapted for connection to a chassis of a trailer for a semi-trailer truck,
    the flatbed deck having sides and ends,
    flatbed deck corner connectors mounted at corners of the flatbed deck,
    a three-dimensional rigid lid having a top, sides and ends and an open bottom,
    the open bottom of the lid and the flatbed deck having similar peripheral dimensions,
    lid corner connectors mounted wherein the lid sides and the lid ends intersect at corners of the lid open bottom, and
    interconnectors interconnecting the lid corner connectors and the flatbed deck corner connectors when the lid corner connectors are juxtaposed with the flatbed deck corner connectors,
    whereby juxtaposing the lid corner connectors and the flatbed deck corner connectors and engaging the interconnectors seals the lid on the flatbed deck, secures the lid on the flatbed deck and protects cargo on the flatbed deck from weather elements and from theft,
    whereby disengaging of the interconnectors from the lid corner connectors permits lifting of the lid away from the flatbed deck and permits loading and securing cargo on the flatbed deck from the sides and ends of the flatbed deck before the lid is lowered on the flatbed deck, and wherein the chassis has corner castings at front and rear corners of the chassis and the flatbed deck has lower corner castings at lower corners of the flatbed deck, and further comprising frame twist locks connecting the chassis corner castings and the flatbed deck lower corner castings.

11. The apparatus of claim 10, wherein the flatbed deck corner connectors and the lid corner connectors comprise complementary flatbed deck upper corner castings and lid corner castings and the interconnectors comprise lid twist locks.

12. The apparatus of claim 11, wherein the lid twist locks are assembled in the flatbed deck upper corner castings.

13. The apparatus of claim 11, wherein the lid twist locks have handles to rotate and engage and disengage the lid twist locks with the lid corner castings, and wherein the handles of the lid twist locks are lockable against sides of the flatbed deck.

14. The apparatus of claim 13, wherein the lid twist locks are retractable in the flatbed deck upper corner castings.

15. The apparatus of claim 10, further comprising multiple cargo tie downs mounted on the flatbed deck near sides of the flatbed deck.

16. The apparatus of claim 15, wherein the cargo tie downs are D-ring tie downs that are flush mounted along the perimeter of the flatbed deck to tie down cargo.

17. The apparatus of claim 10, wherein the lid has lifting fork tubes near a center of the top of the lid.

18. The apparatus of claim 10, wherein the flatbed deck has lifting fork tubes near a center of the flatbed deck for lifting the flatbed deck from the trailer chassis when the frame twist locks are disengaged from the flatbed deck lower corner castings.

19. The apparatus of claim 10, wherein more than one three-dimensional rigid lid having tops, sides, ends and open bottoms having lid corner connectors are attachable to the flatbed deck.

* * * * *